United States Patent [11] 3,589,386

| [72] | Inventors | Walter R. Chapman<br>Erie;<br>Willis R. Wolfe, Girard, both of, Pa. |
|---|---|---|
| [21] | Appl. No. | 854,441 |
| [22] | Filed | Sept. 2, 1969 |
| [45] | Patented | June 29, 1971 |
| [73] | Assignee | Air-Con, Incorporated<br>Lake City, Pa. |

[54] PILOT VALVE
8 Claims, 2 Drawing Figs.

| [52] | U.S. Cl. | 137/269,<br>137/315, 137/469, 137/539.5 |
|---|---|---|
| [51] | Int. Cl. | F16k 15/04 |
| [50] | Field of Search | 137/469,<br>470, 509, 510, 315, 269 |

[56] References Cited
UNITED STATES PATENTS

| 2,704,549 | 3/1955 | Struad | 137/469 |
|---|---|---|---|
| 3,055,388 | 9/1962 | Tebb | 137/469 |

*Primary Examiner*—Harold W. Weakley
*Attorney*—Ralph Hammar

ABSTRACT: A pressure-operated valve having a ball piston means between opposed seats in which a spacer positions one of the seats so that the cumulative spacing between the piston and the seats is equal to the thickness of the spacer. In other words, when the spacer is removed, the ball piston means is in contact with both seats.

Walter R Chapman
Willis R Wolfe
INVENTOR.

BY Ralph Hammar
Attorney

PILOT VALVE

This invention is a pressure-operated snap-acting relief or pilot valve having ball piston means disposed between sharp edged annular seat members. One of the seat members has a press fit in the valve body so that it remains in the position in which it is placed. The other seat member has a shoulder clamping a spacer against a shoulder on the body. The thickness of the spacer is equal to the cumulative spacing between the piston and the seats so that in the absence of the spacer the piston is in contact with both seats.

Figure 1:
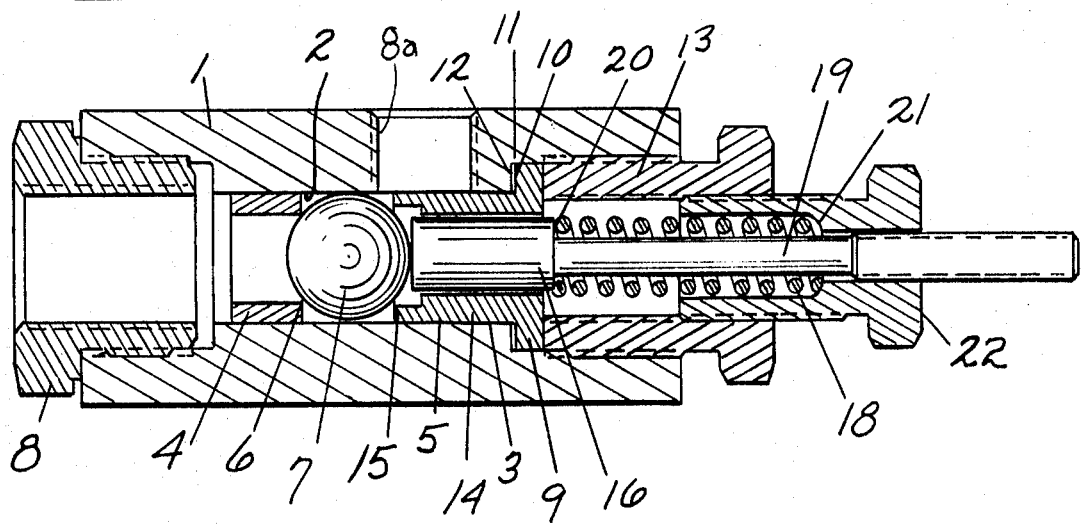
FIG. 1 is a longitudinal section through a pilot valve.

In the drawing, there is shown a valve having a body 1 with aligned bores 2 and 3 respectively receiving seat members 4 and 5. The seat members 4, 5 are preferably made of hard, non corrosive material such as stainless steel while the body 1 may be made of a softer material such as aluminum. The seat member 4 is an annular sleeve having a sharp-edged annular seat 6 presented to a ball piston 7. The seat member 4 is adjacent to an inlet fitting 8 for connection to a line leading to the pressure to be controlled. An outlet 8a leads from the space between the seat members 4 and 5.

The seat member 5 has an outwardly projecting flange 9 with a shoulder 10 engaging an annular spacer 11 and clamping it against a shoulder 12 in the body. The clamping pressure is exerted on the flange 9 by a fitting 13 screwed into the valve body 1. Adjacent the flange 9 the seat member 5 has a tubular body portion 14 having a sliding fit in the bore 3 and having adjacent the ball piston 7 a sharp cornered annular seat 15 of larger diameter than the seat 6. At the center of the seat member 5 is a plunger 16 urged against the ball piston 7 by a spring 18 encircling a rod 19 and arranged between a seat 20 on the plunger and a seat 21 on a fitting 22 screwed into the fitting 13. The force exerted by the spring 18 determines the pressure at which the ball piston 7 is lifted off the seat 6. As soon as the ball piston lifts off the seat 6 substantially the full diameter of the ball piston is presented to the incoming pressure and the ball is moved with a snap action against the larger diameter seat 15 where it remains until the inlet pressure drops sufficiently so that the plunger 16 can return the ball 7 against the seat 6. For a spring 18 of fixed spring rate, the differential between the pressure at which the ball piston lifts off seat 6 and the pressure at which the ball lifts off seat 15 and returns to seat 6 is controlled by the sum of the spacing between the seats 6, 15 and the ball piston 7. In this valve the cumulative spacing is equal to the thickness of the spacer 11 so that the pressure differential can be changed at will by removing the spacer 11 and substituting a different spacer of a different thickness. By reason of the construction, the effect of manufacturing and assembly tolerances of the various parts is minimized so that the spacer 11 can become the dominant control for the pressure differential.

In the assembly of the valve, the seat members 4 and 5 are lightly positioned in alignment with the bores 2 and 3 with the ball piston 7 between the seats 6 and 15 and with the spacer 11 omitted. By pressure on the flange 9, the seat 15 is pressed against the ball piston 7 and in turn transmits this pressure through the seat 6 to the seat member 4. By pressure sufficient to overcome the resistance offered by the interference between the seat member 4 and the bore 2, the seat member 4 can be moved along the bore 2 until the shoulder 10 on the flange 9 stops against the shoulder 12 on the body. In this position, the seat members 4 and 5 are stopped with the seats 6 and 15 in engagement with the ball piston 7. This accurately determines the position of the seat member 4 in the valve body 1. The assembly pressure also coins the sharp edged seats 6, 15 into sealing contact with the ball 7. By relieving the pressure and removing the seat member 4, the valve can be reassembled with the spacer 11 and the cumulative spacing between the ball piston 7 and the seats 6 and 15 will now be equal to the thickness of the spacer 11, thereby determining accurately the pressure differential between the pressure at which the piston lifts off seat 6 and the pressure at which the piston lifts off seat 15.

When the valve is used as a pilot valve for a compressor unloader, the pressure at which the ball piston lifts off seat 6 is called the unloading pressure and the seat 6 is called the unloading seat, while the pressure at which the ball piston lifts off seat 15 is called the loading pressure and the seat 15 is called the loading seat.

Figure 2:
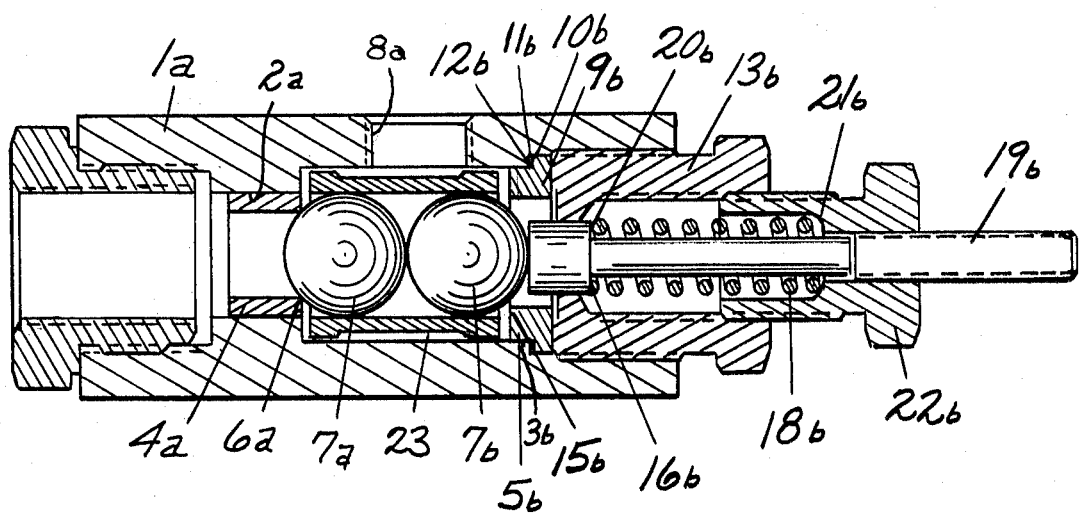
FIG. 2 is a section through a modification having a somewhat different piston structure.

The primary difference between the valve of FIG. 2 and the valve of FIG. 1 is in the construction of the piston which has a carrier 23 for a ball 7a cooperating with seat 6a on seat member 4a and a ball 7b cooperating with a seat 15b on a seat member 5b. The balls 7a and 7b may be the same or different diameter. As in the FIG. 1 valve, the unloading seat member 4a has a press fit in a bore 2a and the seat member 5b has a sliding fit in the bore 3b. The loading seat member 5b has a flange 9b with a shoulder 10b pressing a spacer 11b against a shoulder 12b on the valve body. A fitting 13b clamps the flange 9b against the spacer 11b. A plunger 16b exerts a biasing pressure on the ball 7b normally holding the ball 7a against the seat 6a. The spring 18b surrounds a rod 19b and is arranged between a seat 20b on the plunger 16b and a seat 21b on a fitting 22b screwed into the fitting 13b.

The FIG. 2 valve is assembled in the same manner as the FIG. 1 valve with the spacer 11b omitted so that pressure exerted on the seat member 5b moves the seat member 4a to the final position in which the shoulders 10b and 12b are in engagement and the balls 7a and 7b are in engagement respectively with the seats 6a and 15b. Upon reassembly of the valve with the spacer 11b of the desired thickness, the pressure differential between loading and unloading pressure will be accurately fixed independent of manufacturing and assembly tolerances of the various components of the valve.

What we claim is:

1. A valve comprising a body having an inlet and an outlet, first and second seat members respectively having first and second sharp cornered coaxial annular seats spaced from and presented toward each other, the outlet communicating with the space between the seats and the inlet communicating with the first seat member remote from its seat, the first seat member having a press fit in the body so that it remains in the position in which it is placed, a first shoulder on said body surrounding the second bore, the second seat member having a second shoulder adapted to stop against said first shoulder, a piston between the seats having ball means for engaging the seats, and means for clamping the second shoulder against the first shoulder, removable spacing means for varying the spacing between said first and second seats whereby the first and second seat members and ball means may be assembled in two modes respectively with and without the spacing means so the spacing between the seat members in said modes differ by the thickness of the spacing means and in one mode the ball means is in engagement with both seats and the first seat member is pressed into the body and in the other mode the cumulative spacing between the ball means and seats is equal to the thickness of the spacing means.

2. The valve of claim 1 in which the piston comprises a ball.

3. The valve of claim 1 in which the piston comprises a carrier with a ball at opposite ends presented respectively to the first and second seats.

4. The valve of claim 1 in which the body has a bore in which the second seat has a sliding fit.

5. The valve of claim 1 having in addition spring means exerting a force on the piston in the direction to move the piston away from the second seat.

6. The valve of claim 7 in which the second seat member has a sliding fit in the body so that by initially assembling the valve seats and ball means in the body with the spacer omitted and the shoulders in contact with each other and with the ball means in engagement with both seats and then removing the second seat member and reassembling with the spacer present accurate spacing of the seats is obtained and the effect of manufacturing tolerances in the initially assembled parts is eliminated.

7. The valve of claim 1 in which the spacing means in said other mode is between the first and second shoulders.

8. The valve of claim 1 in which the second seat member has a sliding fit in the body so that by initially assembling the valve seats and ball means in the body in one mode and with the ball means in engagement with both seats and then removing the second seat member and reassembling in the other mode accurate spacing of the seats is obtained and the effect of manufacturing tolerances in the initially assembled parts is eliminated.